(12) United States Patent
Bunse et al.

(10) Patent No.: US 11,932,187 B2
(45) Date of Patent: *Mar. 19, 2024

(54) METHOD FOR DETECTING THE APPLICATION OF SCRATCHES AND BUMPS

(71) Applicant: APTIV TECHNOLOGIES LIMITED, St. Michael (BB)

(72) Inventors: Rainer Bunse, Morsbach (DE); Andreas Vogt, Much (DE); Vikas Kumar, Gummersbach (DE)

(73) Assignee: Aptiv Technologies Limited, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,910

(22) Filed: Jun. 3, 2022

(65) Prior Publication Data

US 2022/0297624 A1 Sep. 22, 2022

Related U.S. Application Data

(63) Continuation of application No. 16/841,748, filed on Apr. 7, 2020, now Pat. No. 11,351,943.

(30) Foreign Application Priority Data

Apr. 12, 2019 (EP) .................................... 19169051

(51) Int. Cl.
*B60R 21/0132* (2006.01)
*B60Q 9/00* (2006.01)

(52) U.S. Cl.
CPC .......... *B60R 21/01336* (2014.12); *B60Q 9/00* (2013.01); *B60R 2021/01322* (2013.01)

(58) Field of Classification Search
CPC .... B60R 21/01336; B60R 2021/01322; B60Q 9/00
See application file for complete search history.

(56) References Cited

U.S. PATENT DOCUMENTS

| 6,636,794 | B2* | 10/2003 | Yamashita | .......... B60R 21/0133 |
| | | | | 701/46 |
| 9,704,309 | B2* | 7/2017 | Niemann | ............. G07C 5/0816 |
| 11,351,943 | B2* | 6/2022 | Bunse | ...................... B60Q 9/00 |
| 11,562,570 | B2* | 1/2023 | Iyer | ....................... G06Q 40/08 |
| 2006/0176161 | A1 | 8/2006 | Bonitz | |
| 2010/0308974 | A1 | 12/2010 | Rowland et al. | |
| 2010/0312435 | A1* | 12/2010 | Mase | .................. B60R 21/0132 |
| | | | | 701/46 |

(Continued)

FOREIGN PATENT DOCUMENTS

| DE | 102006040653 A1 | 3/2008 |
| DE | 102016210773 A1 | 12/2017 |

OTHER PUBLICATIONS

Extended European Search Report for Application No. EP 19 16 9051 dated Oct. 23, 2019.

*Primary Examiner* — Gertrude Arthur Jeanglaude
(74) *Attorney, Agent, or Firm* — Harness, Dickey & Pierce, P.L.C.

(57) ABSTRACT

A method for detecting scratches and bumps applied to a vehicle uses an acceleration sensor. Signals of the sensor are analyzed and evaluated based on amplitude and frequency. Relationships between the amplitudes and frequencies provide a basis to classify a vehicle contact event as a bump or a scratch.

18 Claims, 5 Drawing Sheets

(56) References Cited

U.S. PATENT DOCUMENTS

2014/0306807 A1   10/2014  Rowland et al.
2015/0091718 A1    4/2015  Niemann et al.
2019/0107998 A1    4/2019  Hawk et al.

* cited by examiner

METHOD FOR DETECTING THE APPLICATION OF SCRATCHES AND BUMPS

CROSS REFERENCE TO RELATED APPLICATION

This application is a continuation of U.S. patent application Ser. No. 16/841,748, filed on Apr. 7, 2020, which claims priority to European Patent Application No. 19169051.0, filed on Apr. 12, 2019.

FIELD

The present disclosure relates to a method for detecting the application of scratches and/or bumps to a vehicle.

BACKGROUND

It is desirable to get information if scratches and/or bumps have been applied to a vehicle causing damage because this information can be stored and/or can be transmitted to the car owner. Further, based on this information certain actions can be initiated such as the activation of a horn, of a video camera and/or of flashlights or the like.

Accordingly, there is a need for such a method which is able to provide a reliable and cost-effective detection.

SUMMARY

In one aspect, the present disclosure is directed to a method for detecting the application of scratches and/or bumps to a vehicle using at least one acceleration sensor mounted to the vehicle, wherein signals which are output by the acceleration sensor are monitored and analyzed by means of an electronic device. The method includes analyzing the envelope of the signals, determining if a signal is to be evaluated based on the envelope analysis and—if the signal is to be evaluated—evaluating the signal on the basis of a duration and a frequency of the signal.

The signals are evaluated in a plurality of frequency bands, for example eight frequency bands, which are respectively filtered out from the total bandwidth of the signal. This allows for a relatively fast and reliable analysis and provides several advantages. First, the noise can be removed from signals to be evaluated. Further, it allows to distinguish between different events based on a frequency and/or a frequency spectrum. Finally, the frequency bands can be adapted to the performance of the CPU which will be used for analyzing the signal.

In the above method a conventional acceleration sensor may be used, which forms part of an antitheft system for detecting angle-changes of the vehicle, thereby integrating a further functionality in the system. The acceleration sensor can be mounted inside the vehicle, e.g. in the overhead console of the vehicle. If a scratch or a bump is applied to an outer surface of the vehicle, structural vibrations are caused in the vehicle and sensed by the acceleration sensor. This allows a signal analysis to automatically determine if an event has occurred and if an event has occurred to determine if this event has caused a damage to the vehicle.

According to the disclosed method not every detected signal is evaluated. Rather, it is first determined if a signal is to be evaluated to distinguish over noise, such as traffic noise, loud sounds, e.g. from events, or the like.

The determination if a signal is indeed to be evaluated is based on an analysis of the envelope of the signals. The evaluation of the signal is then performed on the basis of a duration and a frequency of the signal. Not only the duration of the signal is determined but it is also analyzed in which frequency range the signal has occurred. On the basis of this information it is possible to categorize the signal and to decide what kind of event was detected.

According to the present disclosure the envelope of a signal is understood as the course of the outer contour of a signal or as the shape of a signal over a certain time.

According to an embodiment, a sensor may be used that senses an acceleration in three perpendicular axes wherein the plurality of frequency bands is filtered out and evaluated from signals of all three axes. This increases the detection reliability. By comparing the results of measurements in three axes perpendicular to each other, the accuracy can be improved.

According to a further embodiment an acceleration sensor may be used that does not directly contact an impact surface of the vehicle. The sensor may be placed in an overhead console of a vehicle or between the headliner and the roof of a vehicle. This allows an inexpensive manufacturing since the sensor does not need to be attached to the vehicle roof or to a part of a chassis of the vehicle. Surprisingly, the described method can be implemented very well without providing a direct contact between an impact surface of the vehicle and the sensor.

According to a further embodiment the frequency bands that are filtered out from the total bandwidth of the signal may have a width of about 100 to 500 Hz, e.g. 200 Hz. This has proven as a suitable width for evaluating the signals without excessive computing capabilities.

According to a further embodiment the signals can be evaluated in a frequency band having a total width from about 0 Hz to about 4000 Hz, e.g. 1600 Hz. This range has proven to be an advantageous range sufficient to distinguish between scratches and bumps on various surfaces of a vehicle.

According to an embodiment, the step of analyzing the envelope of the signals includes setting an amplitude threshold and filtering out signals having an amplitude that exceeds the threshold. By using such a threshold it can be avoided to evaluate signals which might result from noise or other sources.

According to a further embodiment the evaluation of the signals in the plurality of frequency bands may include to extract an upper envelope of a signal. Such upper envelope can be defined by signals that lie above an average value of the signal.

According to a further embodiment the evaluation of the signals may include a determination of a decay percentage of an amplitude of a signal in each frequency band. The evaluation may also include a determination of a damping characteristic of a signal in each frequency band. By determining a damping characteristic it can be distinguished e.g. between an impact on glass or on metal, such as an impact on the windshield or the roof. In both cased the damping behavior of the signal can be quite different and a bump on the windshield may not result in a damage whereas a bump on the roof or on the door may lead to a damage.

According to a further embodiment the signals may be classified into categories based on a combination of a time threshold and the square of the time threshold wherein the categories may include a scratch, multiple bumps and single bumps with or without damage. A time threshold can be set to distinguish events based on the time that has lapsed during the event.

According to a further embodiment the signals may be classified into categories based on an amplitude threshold over a median of the signal wherein the categories may include scratches and multiple bumps.

According to a further embodiment the signals may be classified into categories based on an average of peak amplitudes, a decay percentage of an amplitude and a damping characteristic of a signal wherein the categories may include single bumps with or without damage.

According to an embodiment, the step of analyzing the envelope of the signal may include a determination of an event occurrence time which includes a raise time and a decay time of the signal. Due to a combined consideration of the raise time and the decay time a reliable occurrence time can be determined to distinguish between signals which are not to be evaluated and signals which are worthwhile or necessary to analyze.

According to a further embodiment the signals can be classified into a long-time event and a short-time event based on the event occurrence time. This simplified classification provides a fast and reliable distinction between scratches and bumps and between single bumps and multiple bumps.

According to a further embodiment signals can be classified into categories, said categories including "no event", "scratch", "bump without damage" and "bump with damage". This is a further simplification of the disclosed method which nevertheless provides a reliable distinction and reliable and fast results.

According to a further embodiment the long-time events can be classified into scratches and multiple bumps based on the sequence of the amplitude of the signal over time. If the signal e.g. shows a somewhat continuous amplitude for a longer duration, the event can be classified as a scratch whereas a plurality of short-time pulses over a longer period of time can be classified as multiple bumps.

According to a further embodiment the bumps can be classified as bumps with or without damage based on an amplitude and a frequency of the signal. If the signal occurs in a higher frequency range it can be classified as a bump and if the signal shows an amplitude above a certain threshold, it can be classified as a bump with damage.

The thresholds are usually not fix values. During development and validation the required thresholds have to be determined and will be selected during runtime out of a parameter set. Such parameters are typically stored in an nonvolatile memory. The threshold can also be used to adapt the sensitivity of the system based on the requirements.

According to a further embodiment the short-time event can be classified into single bumps with and without damage based on an amplitude and the frequency of the signal. For example, a lower amplitude in a higher frequency range relates to a single bump without damage whereas a higher amplitude in a higher frequency range relates to a bump causing a damage.

In another aspect, the present disclosure is directed to an electronic device, said device being configured to carry out several or all steps of the method described herein.

The electronic device may include a processor, at least one memory and at least one non-transitory data storage. The non-transitory data storage and/or the memory may include a program for instructing the device to perform several or all steps or aspects of the method described herein.

In another aspect, the present disclosure is directed at a non-transitory computer readable medium including instructions for carrying out several or all steps or aspects of the method described herein. The computer readable medium may be configured as: an optical medium, such as a compact disc (CD) or a digital versatile disk (DVD); a magnetic medium, such as a hard disk drive (HDD); a solid-state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed to a computer program for instructing a computer to perform several or all steps or aspects of the method described herein.

BRIEF DESCRIPTION OF THE DRAWINGS

Exemplary embodiments and functions of the present disclosure are described herein in conjunction with the following drawings, showing schematically in.

DETAILED DESCRIPTION

Figure 1:
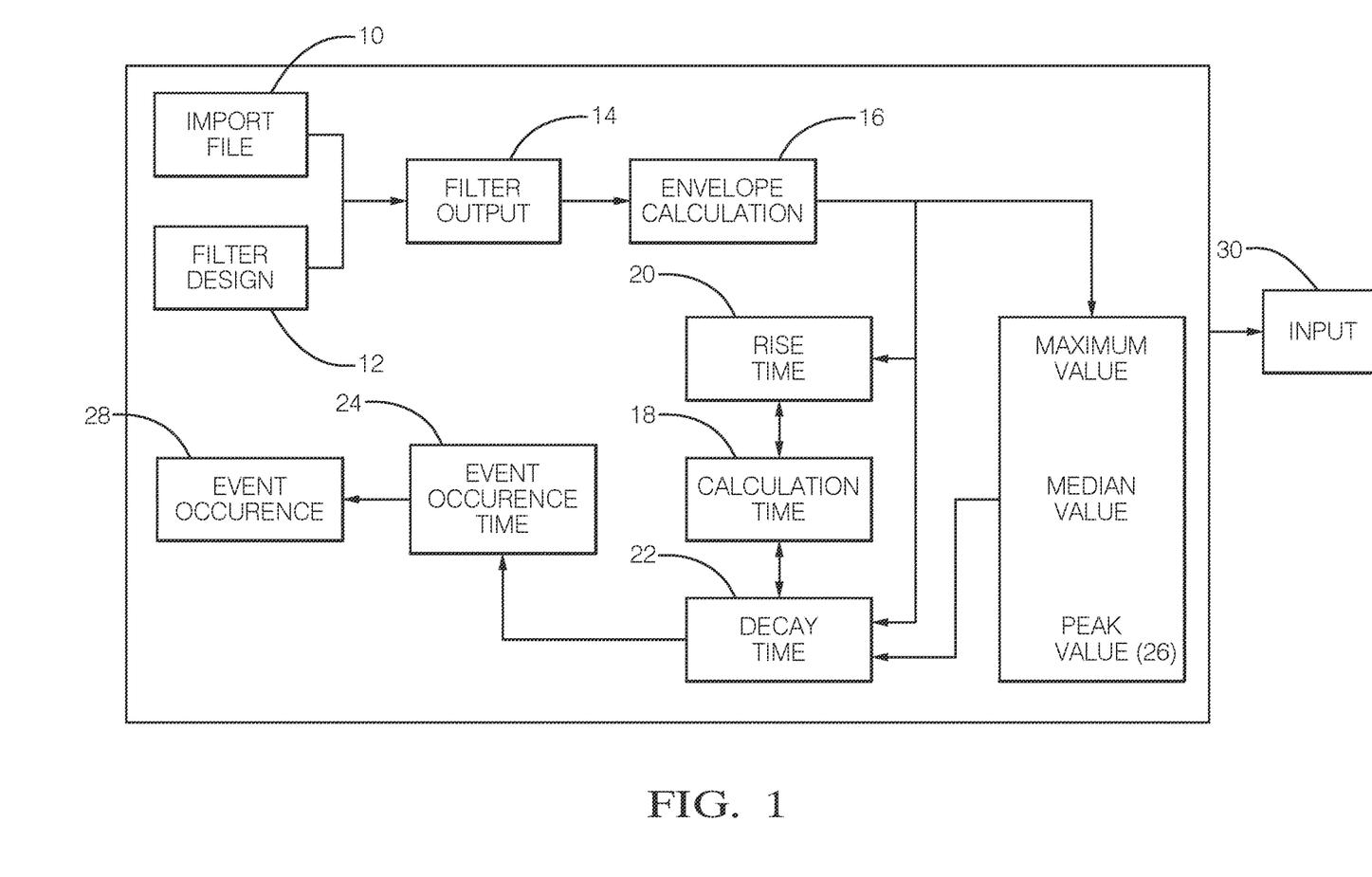
FIG. 1—a flowchart illustrating an envelope analysis.

FIG. 1 illustrates various steps of the disclosed method performed within a system for determining if a signal is to be evaluated or not. The data received from at least one acceleration sensor, e.g. data from an acceleration sensor sensing the acceleration in three perpendicular axes, are first imported at 10. Thereafter, it is determined if a signal is to be evaluated or not based on an analysis of the envelope of the signals. This may comprise to set an amplitude threshold and to filter out signals having an amplitude that exceed the threshold.

In a next step a filter design 12 is applied to filter out several discrete frequency bands from a total bandwidth of the signal. In an exemplary method a total bandwidth of 0 to 1600 Hz is filtered and divided into eight frequency windows or frequency sub-bands each having a bandwidth of e.g. 200 Hz (see also FIGS. 4 to 7). As a result, the filter 12 outputs twenty-four signals resulting from three axes and eight frequency sub-bands.

The analysis of the envelope of the signal includes a determination of an event occurrence time at step 18 said event occurrence time including a raise time 20 and a decay time 22 of the signal. Alternatively, the analysis of the envelope of the signal may include to set an amplitude threshold and to filter out signals having an amplitude that exceeds the threshold.

Figure 2:
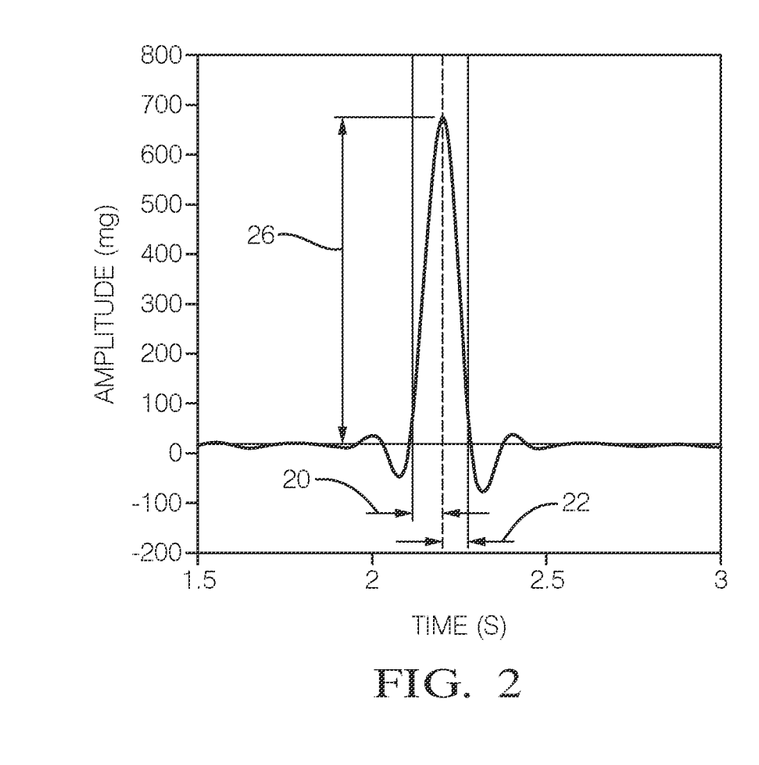
FIG. 2—characteristics of a bump.
Figure 3:
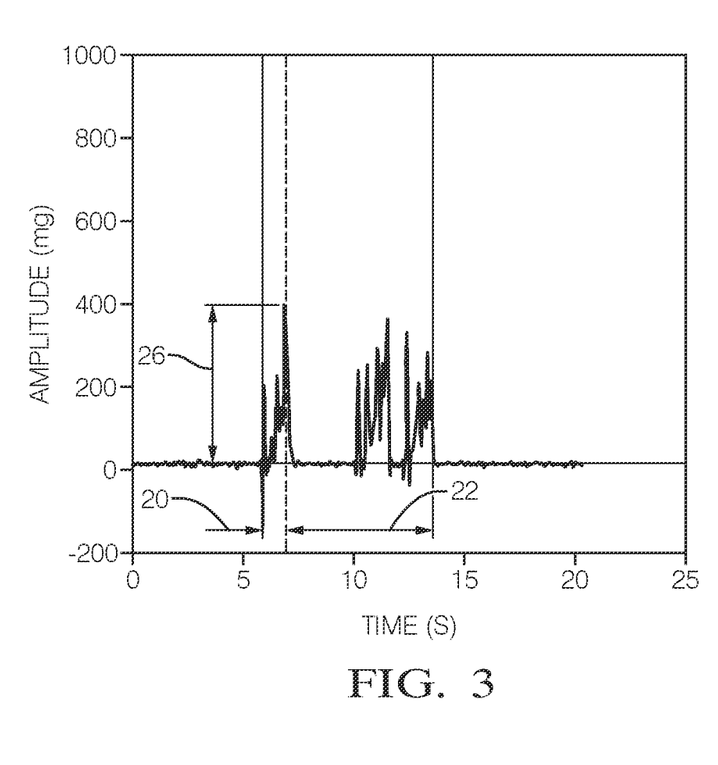
FIG. 3—characteristics of a scratch.

FIG. 2 illustrates an example of a signal resulting from a bump with damage, said signal being retrieved from a frequency sub-band of 1200 to 1400 Hz. As shown in FIG. 2, the raise time 20 and the decay time 22 show about the same duration of respectively about 0.1 s. In contrast thereto, FIG. 3 shows a signal resulting from a scratch filtered out in a frequency band of 1200 to 1400 Hz wherein the raise time (up to a maximum value) is about 1 s whereas the decay time 22 of the signal has a much higher duration of about 6 s.

As shown in FIG. 1, for determining the decay time 22 of the signal a peak value 26 resulting from a maximum value and a median value of the signal is determined (see also FIGS. 2 and 3) and on the basis of the resulting raise time and decay time the event occurrence time is determined in step 24. If the event occurrence time lies above a preset threshold, an event occurrence is set at step 28 and the signal data is input into a classifier, the operating principle of this classifier being shown in FIG. 8. The preset level of a threshold is determined in accordance with a parameter set for use during runtime of the present system. Such parameters may be stored in memory of the system, e.g., nonvolatile memory, and the threshold can be used to adapt the sensitivity of the present system based on the stored parameters.

Figure 8:
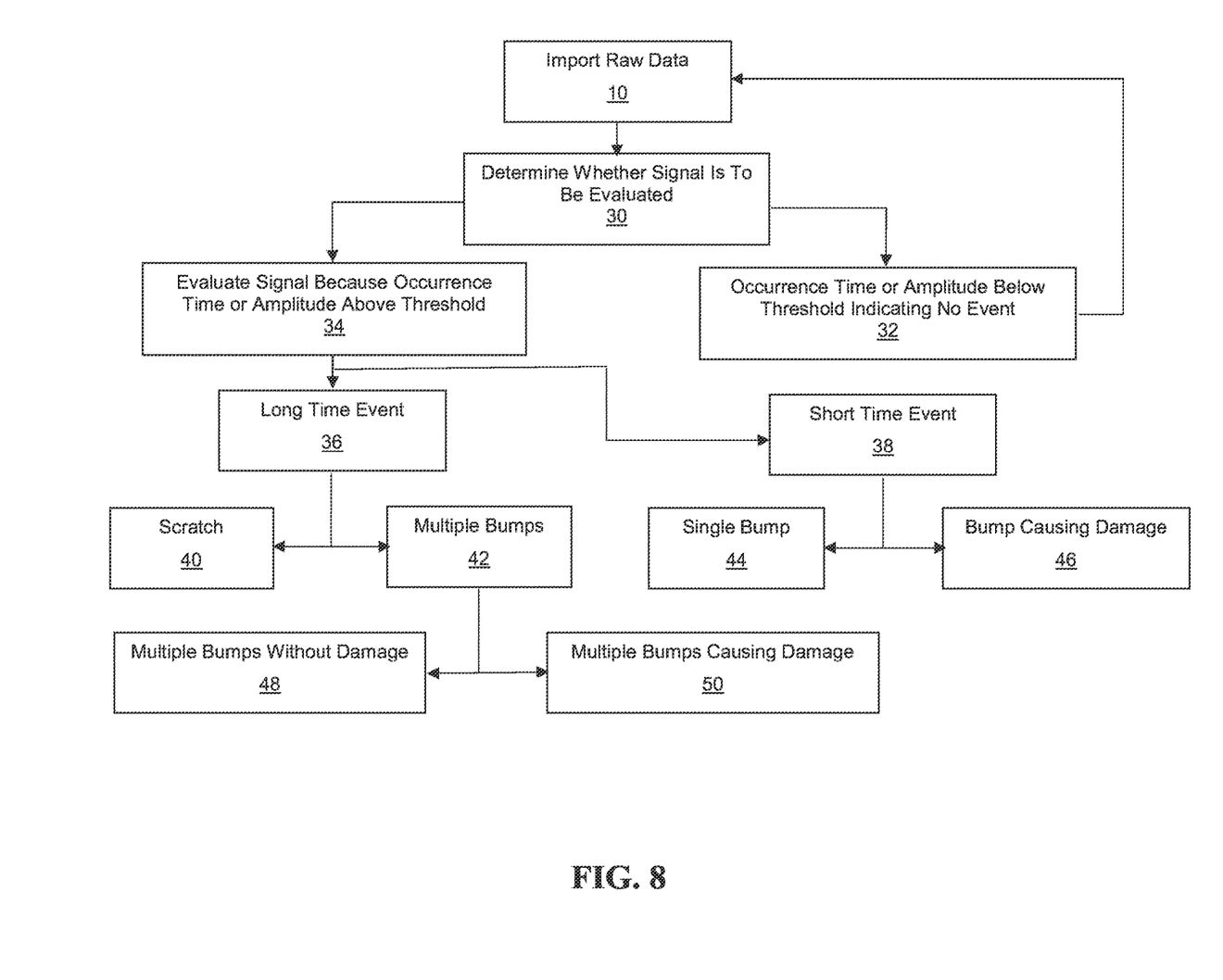
FIG. 8—a flowchart illustrating an event classification.

FIG. 8 shows that the raw data is imported at 10 to receive at 30 data which is processed in FIG. 1 to determine if a signal is to be evaluated or not. If the event occurrence time 28 or an amplitude lies below a preset threshold it is decided in step 32 that the category of "no event" applies and the method returns to step 10. If the event occurrence time 28 or an amplitude lies above the threshold it is determined that the signal is further to be evaluated and the signal will be evaluated starting in step 34 and based on a duration and a frequency of the signal. First, it is determined if a long-time event 36 or a short-time event 38 is analyzed. If a long-time event 36 is analyzed, a scratch (FIG. 3) or multiple bumps (FIG. 2) could have been applied to the vehicle. If a short-time event 38 (FIG. 2) has been detected, an analysis will follow if the signal shows a relatively low amplitude in higher frequencies resulting from a single bump 44 or if relatively high amplitudes in higher frequency ranges are detected resulting from a bump 46 causing a damage. Number ranges for the relatively lower and higher amplitudes of the different classes of events are usually not fixed values. Rather, those numbers are calculated in dependence of the event, the vehicle and of customer requirements (what event has to be detected). Those values (coefficients) will be calculated offline based on an initial analysis during development/validation of the respective vehicle. Those calculated coefficients are used during run-time as a combination with input values for a neural network function. Based on this combination different outputs are received as different events.

After it has been detected in step 42 that multiple bumps were analyzed, it is further analyzed if a long-time event signal shows a lower amplitude in higher frequencies resulting from multiple bumps 48 without causing a damage. Alternatively, if the signal shows a higher amplitude in higher frequencies, multiple bumps 50 causing a damage have been applied to the vehicle.

Figure 4:
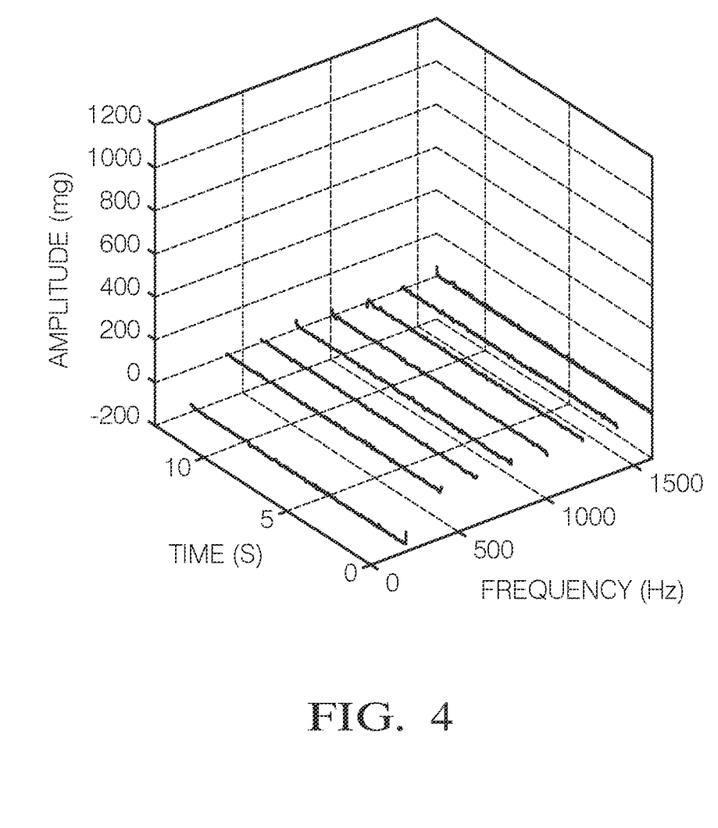
FIG. 4—a signal classified into the category no event.

FIGS. 4 to 7 show signals of different categories allowing the classification described above. FIG. 4 shows very small amplitudes in all frequency sub-bands. Accordingly, the resulting signal is classified as "no event" according to step 32 of FIG. 8.

Figure 5:
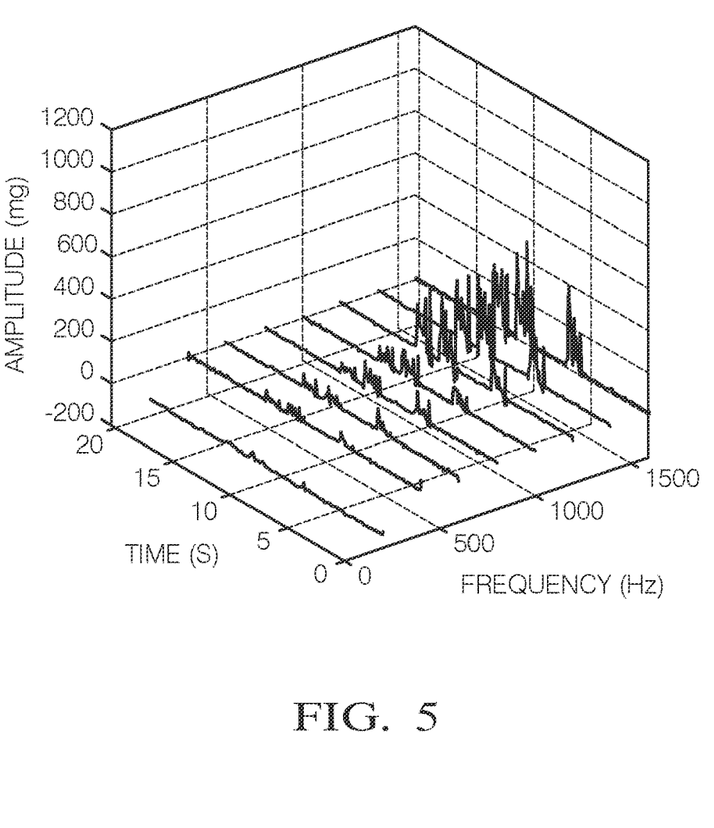
FIG. 5—a signal classified into the category scratch.

FIG. 5 shows a long-time event 36, namely a signal having a duration of several seconds and a relatively high amplitude over several seconds in a higher frequency range of about 1000 to 1600 Hz. Accordingly, this event is classified as a scratch 40.

Figure 6:
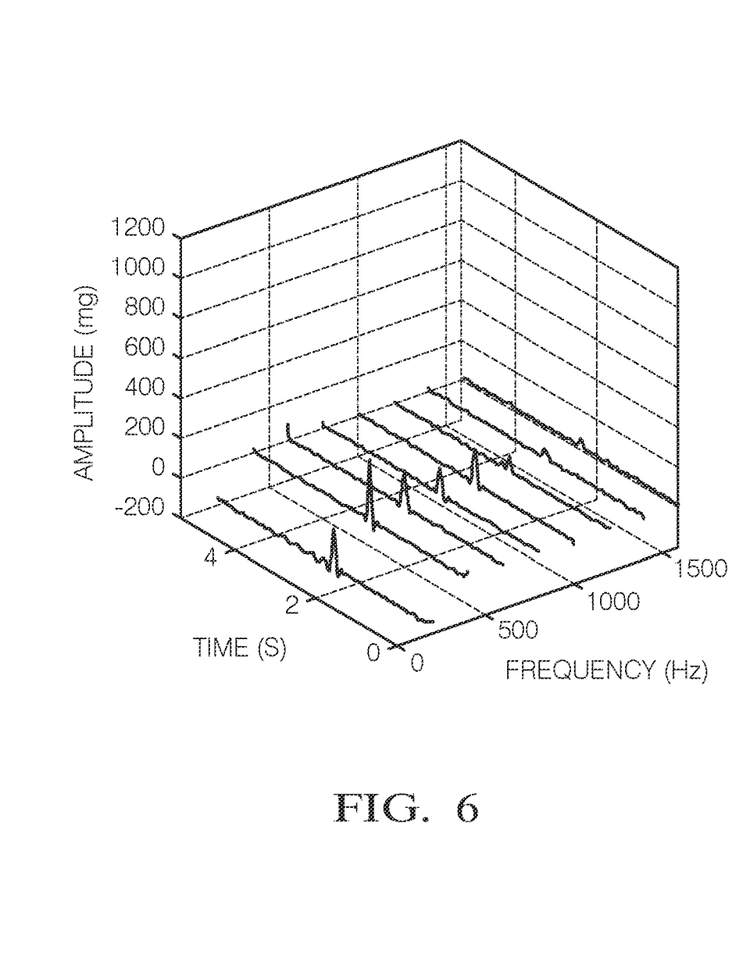
FIG. 6—a signal classified into the category bump without damage.

FIG. 6 shows a short-time event 38 with lower amplitudes in lower frequencies (the maximum is at about 400 Hz) reflecting a single bump event 44.

Figure 7:
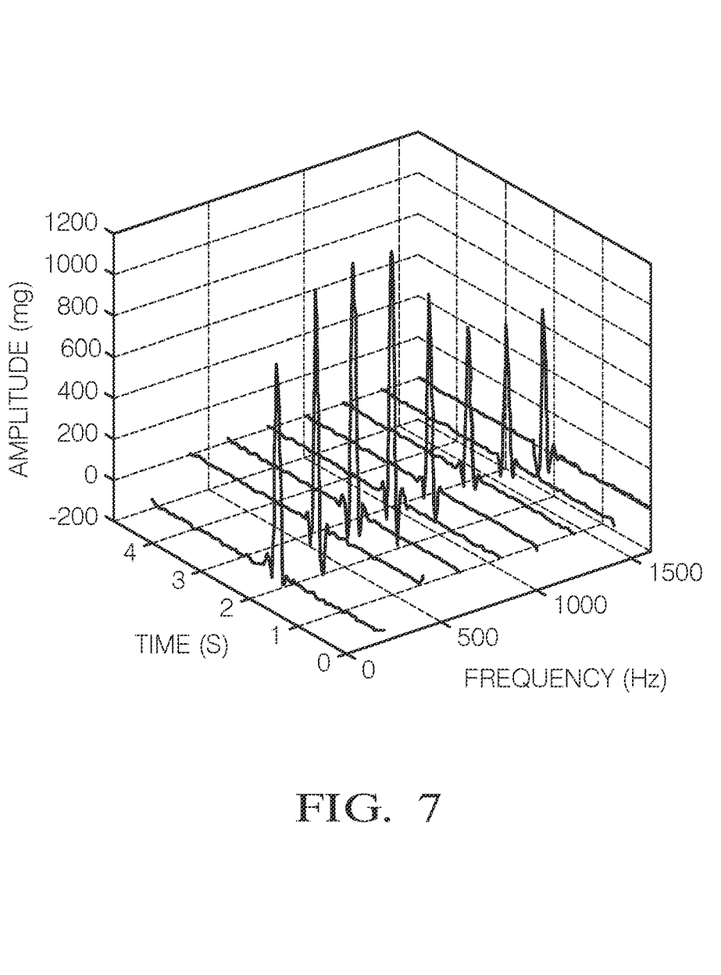
FIG. 7—a signal classified into the category bump with damage.

Finally, FIG. 7 shows very high amplitudes with a relatively short duration in low and in high frequency ranges resulting from a bump 46 causing a damage.

The identification of these apparent relationships between the relatively lower and higher amplitudes and the lower and higher frequencies provide, at least in part, for the relatively accurate event classification of the present disclosure. The specific values of these relationships for the event classification may be (dynamically) set depending on the events to be classified and the vehicle or vehicle type. Typically, these values (e.g., coefficients) are calculated based on an initial analysis regarding the vehicles. Those calculated coefficients are then used during runtime of the present system as a combination with input values for a neural network function. Based on this combination the different outputs of the system provide for the classification of the different events.

The present disclosure includes the following embodiments:

First Embodiment

A method for detecting the application of scratches and/or bumps to a vehicle using at least one acceleration sensor mounted to the vehicle, wherein signals which are output by the acceleration sensor are monitored and analyzed by means of an electronic device, the method including: analyzing the envelope of the signals, determining if a signal is to be evaluated based on the envelope analysis; and—if the signal is to be evaluated, evaluating the signal on the basis of a duration and a frequency of the signal.

A method according to the first embodiment, wherein analyzing the envelope of the signal includes a determination of an event occurrence time which includes a rise time and a decay time of the signal.

A method according to the above embodiment, wherein the signals are classified into a long-time event and a short-time event based on the event occurrence time.

A method according to the first embodiment, wherein the signals are classified into categories, said categories including no event, scratch, bump without damage and bump with damage.

A method according to as above, wherein the long-time events are classified into scratches and multiple bumps based on the sequence of the amplitude of the signal over time.

A method as above, wherein the bumps are classified into bumps with and without damage based on an amplitude and a frequency of the signal.

A method as above, wherein the short-time events are classified into single bumps with and without damage based on an amplitude and a frequency of the signal.

A method according to the first embodiment, wherein the signals are evaluated in a plurality of frequency bands, in particular in eight frequency bands, which are respectively filtered out from the total bandwidth of the signal.

A method as above, wherein the frequency bands have a width of about 150-250 Hz, e.g. 200 Hz.

A method according to the first embodiment, wherein the signals are evaluated in a frequency band having a total width of about 1400-1800 Hz, e.g. 1600 Hz.

A method according to the first embodiment, wherein the sensor senses an acceleration in three axes.

Second Embodiment

A method for detecting the application of scratches and/or bumps to a vehicle using at least one acceleration sensor mounted to the vehicle, wherein signals which are output by the acceleration sensor are monitored and analyzed by means of an electronic device, the method including: analyzing the envelope of the signals, determining if a signal is to be evaluated based on the envelope analysis; and—if the signal is to be evaluated—evaluating the signal on the basis of a duration and a frequency of the signal, wherein the signals are evaluated in a plurality of frequency bands, of e.g. 150-250 Hz, which are respectively filtered out from the total bandwidth of the signal.

A method according to the second embodiment, wherein the sensor senses an acceleration in three perpendicular axes and the plurality of frequency bands is filtered out and evaluated from signals of all three axes.

A method according to the second embodiment, wherein the signals are evaluated in a frequency band having a total width of about 0-4000 Hz, e.g. 0-1600 Hz or 0-800 Hz.

A method according to the second embodiment, wherein an acceleration sensor is used that does not directly contact an impact surface of the vehicle.

A method according to the second embodiment, wherein analyzing the envelope of the signals includes setting an amplitude threshold and filtering out signals having an amplitude that exceeds the threshold.

A method according to the second embodiment, wherein the evaluation of the signals in the plurality of frequency bands includes extracting an upper envelope of a signal, e.g. extracting values above an average value of the signal.

A method according to the second embodiment, wherein evaluating the signals includes a determination of a decay percentage of an amplitude of a signal in each frequency band.

A method according to the second embodiment, wherein evaluating the signals includes a determination of a damping characteristic of a signal in each frequency band.

A method according to the second embodiment, wherein the signals are classified into categories based on a combination of a time threshold and the square of the time threshold, said categories including a scratch, multiple bumps and single bumps with or without damage.

A method according to the second embodiment, wherein the signals are classified into categories based on an amplitude threshold over a median of the signal, said categories including scratches and multiple bumps.

A method according to the second embodiment, wherein the signals are classified into categories based on an average of peak amplitudes, a decay percentage of an amplitude and a damping characteristic of a signal, said categories including single bumps with or without damage.

An electronic device configured to carry out the method of the first or the second embodiment.

A non-transitory computer readable medium including instructions for carrying out the method of the first or the second embodiment.

We claim:

1. A method of classifying a vehicle contact event as at least one of a bump or scratch, the method comprising:
   detecting the vehicle contact event based on a signal from an acceleration sensor associated with the vehicle;
   determining an amplitude of the signal at each of a plurality of frequencies, wherein each amplitude is either a higher amplitude or a lower amplitude and each frequency is either a higher frequency or a lower frequency;
   determining a relationship between the higher amplitudes and each of the higher frequencies and the lower frequencies;
   determining a relationship between the lower amplitudes and each of the higher frequencies and the lower frequencies; and
   classifying the vehicle contact event based on the determined relationships.

2. The method of claim 1, wherein the classifying is based on whether
   the higher amplitudes are at the higher frequencies,
   the higher amplitudes are at the lower frequencies,
   the higher amplitudes are at the higher and lower frequencies,
   the lower amplitudes are at the higher frequencies,
   the lower amplitudes are at the lower frequencies, and/or
   the lower amplitudes are at the higher and lower frequencies.

3. The method of claim 2, wherein the vehicle contact event is classified as at least one bump without damage when the amplitudes of the signal are lower amplitudes at the higher frequencies.

4. The method of claim 2, wherein the vehicle contact event is classified as at least one bump causing damage when the amplitudes of the signal are higher amplitudes at the higher frequencies.

5. The method of claim 2, wherein the vehicle contact event is classified as a scratch when the amplitudes of the signal are higher amplitudes at the higher frequencies over a duration of at least several seconds.

6. The method of claim 2, wherein the vehicle contact event is classified as at least one bump when the amplitudes of the signal are lower amplitudes at the lower frequencies.

7. The method of claim 2, wherein the vehicle contact event is classified as at least one bump causing damage when the amplitudes of the signal are higher amplitudes at the lower and higher frequencies.

8. The method of claim 1, wherein the at least one acceleration sensor senses an acceleration in three perpendicular axes and the plurality of frequency bands is filtered out and evaluated from signals of all three axes.

9. The method of claim 1, comprising analyzing the signal in a frequency band having a total width of about 0-4000 Hz.

10. The method of claim 1, wherein the at least one acceleration sensor does not directly contact an impact surface of the vehicle.

11. The method of claim 1, comprising analyzing an envelope of the signal by setting an amplitude threshold and filtering out portions of the signal having an amplitude that exceeds the threshold.

12. The method of claim 11, comprising extracting an upper envelope of the signal by extracting values above an average value of the signal.

13. The method of claim 1, comprising determining a decay percentage of an amplitude of the signal in each of a plurality of frequency bands.

14. The method of claim 1, comprising determining a damping characteristic of the signal in each of a plurality of frequency bands.

15. The method of claim 1, wherein each of the plurality of frequency bands has a width in a range of 150 Hz to 250 Hz.

16. The method of claim 1, wherein the signal is classified into categories based on a combination of a time threshold and a square of the time threshold, said categories comprising a scratch, multiple bumps and single bumps with or without damage.

17. The method of claim 1, wherein the signal is classified into categories based on an amplitude threshold over a median of the signal, said categories comprising scratches and multiple bumps.

18. The method of claim 1, wherein the signal is classified into categories based on an average of peak amplitudes, a decay percentage of an amplitude and a damping characteristic of the signal, said categories comprising single bumps with or without damage.

\* \* \* \* \*